Dec. 15, 1964     D. W. ELAM     3,161,574
STILL HAVING THIN RESINOUS HEAT TRANSFER SURFACES
Filed Aug. 21, 1961     2 Sheets-Sheet 1

INVENTOR:-
DANIEL W. ELAM
BY
ATTORNEYS

Dec. 15, 1964 D. W. ELAM 3,161,574
STILL HAVING THIN RESINOUS HEAT TRANSFER SURFACES
Filed Aug. 21, 1961 2 Sheets-Sheet 2

INVENTOR:—
DANIEL W. ELAM
BY
Eckhoff and Slick
ATTORNEYS

United States Patent Office 3,161,574
Patented Dec. 15, 1964

3,161,574
STILL HAVING THIN RESINOUS HEAT TRANSFER SURFACES
Daniel W. Elam, Sunnyvale, Calif.
(Lista de Correo, Apartado 112, Ajijic, Jalisco, Mexico)
Filed Aug. 21, 1961, Ser. No. 132,984
7 Claims. (Cl. 202—236)

This application is a continuation-in-part of my application Serial No. 65,383, filed October 27, 1960, and now abandoned.

This invention relates to a still and more particularly relates to a vapor compression water still. At the present time there is increasing interest in economical methods of recovering fresh water from salt or brackish waters. Of all the systems heretofore proposed for producing water economically, one of the most feasible appears to be that of vapor compression distillation wherein sea water is heated and evaporated and the vapor compressed and used as a heat supply for further evaporation. It has been recognized that such vapor compression systems are most efficient when the water is removed from the sea water in small increments with the brine concentration increasing at each increment. However, such differential separation is difficult to achieve in actual practice since the incoming sea water mixes with the brine already contained in the unit and all of the water vapor must then be removed from brine at the outlet concentration. Since water removal is more efficient from brine of low salinity, the mixing of the incoming brine with the existing brine in the system greatly decreases the efficiency.

It has also been recognized that the most efficient process is the one having the smallest temperature difference ($\Delta T$) between the evaporating fluid and the condensing fluid.

An important factor in the design of any still is the overall heat transfer coefficient, U. The value of U must be kept as high as practical and the value not only depends on the thermal conductivity of the layer of material employed but also depends, to a surprising degree, on the thickness of any layer of water which exists on either the evaporation or condensing surfaces of the material. For instance a layer of stagnant water only 0.001 inch thick offers as much resistance to the flow of heat as 0.5 inch of copper. As is later brought out in detail, means are provided on both the evaporation and condensation surfaces for preventing a layer of stagnant water from forming. On the evaporation surfaces, turbulent flow is maintained, while on the condensation surface, drop-wise condensation is promoted, both of which prevent the formation of a stagnant water film and thus contribute to a high U value.

In accordance with the present invention, a highly efficient vapor compression water still is provided wherein the heretofore recognized desiderata are reduced to a practical reality. In the first place, a novel system is provided wherein the flow pattern is such that series flow is achieved of the liquid being fed to the still, i.e., there is no possibility of the incoming salt water mixing with the brine already contained within the system, coupled with parallel flow on the condensing surfaces. This produces a high degree of efficiency.

Secondly, high efficiency is achieved by the employment of novel evaporation-condenser units which have a large area for evaporation with good heat transfer characteristics achieved drop-wise condensation and turbulent flow on the evaporation surface.

In the drawings forming part of this application:

Figure 1:
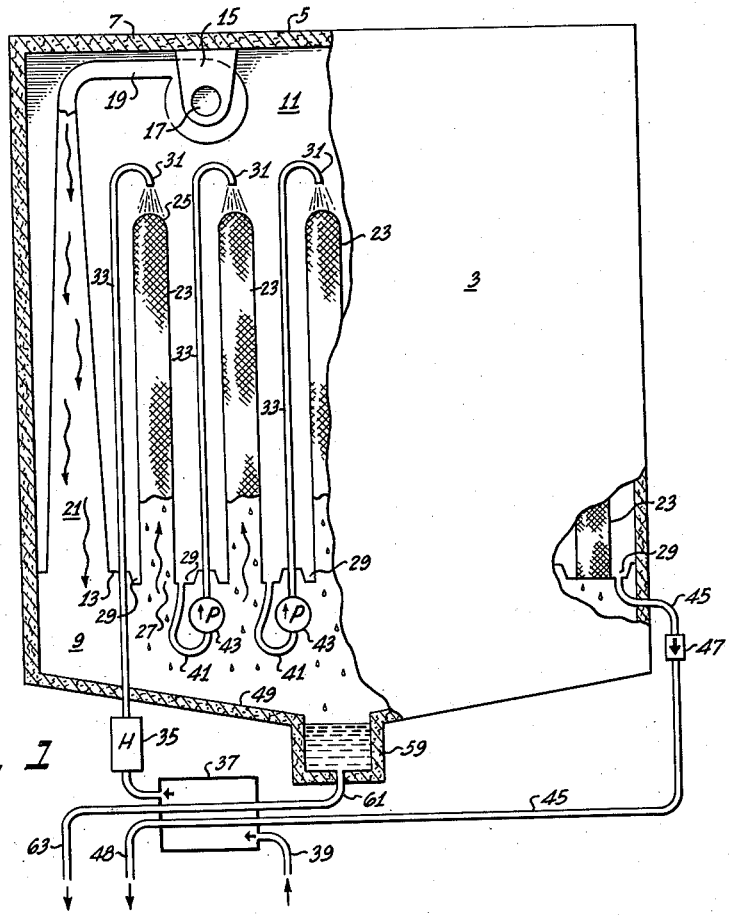
FIGURE 1 is a side elevation of an apparatus embodying the present invention.

Turning now to a description of the drawing by reference characters, there is shown a still 3 having a housing 5, said housing being provided with a layer of insulation material 7. The housing is divided into a relatively small lower portion 9 and a relatively large upper portion 11 by means of the baffle 13. Situated within the upper portion 11 is a fan 15 having an inlet 17 and an outlet 19, said outlet 19 leading to the passage 21 which goes to the lower portion 9. Thus, the upper portion 11 and the lower portion 9 are in vapor communication only through the fan 15 and the action of the fan 15 is such that the lower portion 9 is kept under slightly higher pressure than the upper portion 11. A series of tubes 23 having a closed end 25 and an open end 27 are placed with their open ends extending through catch basins 29 which are formed in the baffle 13. In other words, the open end of each tube 23 is in fluid communication with the lower chamber 9 while the closed end of each tube 23 extends into the upper chamber 11. Since each of the tubes 23 has a catch basin 29 surrounding its bottom, any liquid which runs off the exterior of a tube 23 will be confined to the immediate vicinity of the base of the tube.

Situated directly over each of the tubes is a sprinkler head 31 adapted to distribute liquid over the top of the tube. The sprinkler head is supplied by a pipe line 33. The first of these lines leads to a heater 35, a heat exchanger 37 and is the source of incoming brine from the line 39. A line 41 leads from the bottom of each of the catch basins 29, except the last, to a pump 43 which pumps the liquid through the line 33 and sprinkler head 31 of the next tube and so on. Feeding from the last of the catch basins 29 is a line 45 which serves as the effluent line for the discharge brine. The line 45 may be provided with a check valve 47 and leads through heat exchanger 37 to extract its heat. The cool spent brine is discharged at 48. The bottom of the chamber 9 slopes as at 49 to catch basin 59 which serves to receive the condensate, the condensate being withdrawn through line 61 through the heat exchanger 37 and discharged at 63 as cool fresh water.

Figure 2:
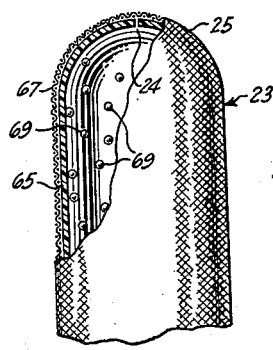
FIGURE 2 is an enlarged partial view, partially in section, of one of the novel evaporation-condenser units.

One of the tubes 23 is shown in detail in FIGURE 2. The tube comprises a very thin lining 65 of plastic, hereinafter described. The film of plastic is only from 0.005 to .0002 inch thick in order that it will have good heat transfer characteristics. The plastic selected for the film 65 is one which is not wetted by water and one which will be mechanically stable at the operating temperature of the unit. Surrounding the plastic film 65 is a sleeve 67 of a screen or open mesh material not corroded by the feed water, such as Monel stainless steel, bronze, Saran, cotton or fiber glass. The screen 67 serves a two-fold purpose. In the first place, the plastic film heretofore described is so thin that it lacks the necessary mechanical strength because of the pressure differential between the chambers and the screen 67 serves to prevent it from rupturing and to maintain its form. Secondly, the screen contributes also by distributing the flow of brine evenly over the surface of the tube and insures turbulence in the descending film, preventing the formation of a stagnant water film and contributing to a high U value. The inside of the tube is of such a material that the surface is not wetted by water, thus preventing film formation so that the water condenses as little droplets 69 within the tube. In this manner, the tubes have good heat transfer characteristics. Preferably a small hole 24 is provided near the top of each of the tubes so that air may be purged from the tubes when the unit is first put on stream. Means may be provided for closing this hole after the unit is operating.

Figure 3:
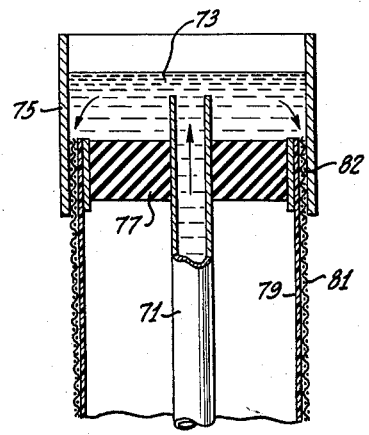
FIGURE 3 is an enlarged sectional view of an alternate form of top structure which may be employed in the evaporation-condensation units.

In FIGURE 3 another form of structure is shown. Here a center tube 71 serves to conduct brine to a pool 73 provided by the annular ring 75 and spacer 77. The ring 75 serves to clamp the plastic film 79 and the mesh 81 to the spacer 77. The mesh 81 provides a path as at 82 for the brine from the pool 73 to the outer surface of evaporator.

Figure 4:
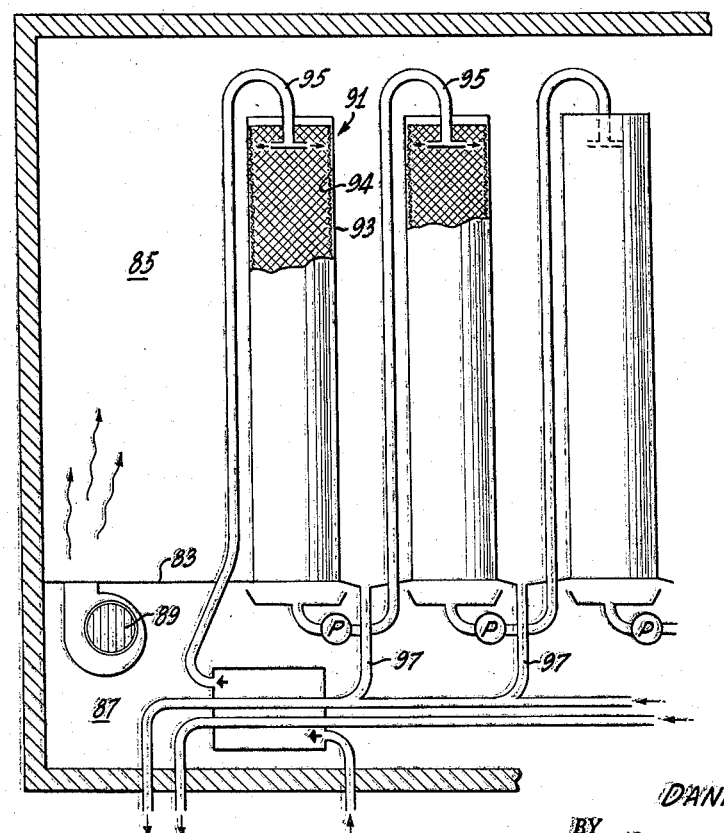
FIGURE 4 is a partial section view showing another embodiment of the invention.

In FIGURE 4 a device is shown which is essentially the same as that shown in FIGURE 1 except that the high pressure, i.e., condensing side is at the top of the apparatus. Here a baffle 83 separates the high pressure chamber 85 from the low pressure chamber 87 and the fan 89 provides the pressure differential. The tubes 91 are constructed with the plastic film 93 on the outside and the mesh 94 on the inside. Tubes 95 serve to convey brine to inside or mesh surfaces of the tubes, while condensate is removed by the tubes 97. Operation is otherwise as is described in connection with FIGURE 1.

In operation, referring to FIGURE 1 salt water such as sea water or brackish water is fed through the line 39 where it is heated by extracting heat from the pure water and brine effluents. The salt water is then passed through the heater 35 where it is brought up to operating temperature (about 214° F.), passed through the first line 33 and spread from the sprinkler head 31 over the top of the first of the tubes 23. In descending the tube, a small amount only of the salt water evaporates, the bulk of the water being collected by the catch basin 29 whence it is taken through the line 41 and pump 43 and passed over the top of the second tube and so on. A little evaporation takes place during each pass, and the sea water becomes progressively more salty and is finally discharged as spent brine through line 45. In the meantime, the vapor produced is picked up by the pump 15 which develops only enough pressure to overcome the loss of vapor pressure due to dissolved solids in the feed plus the pressure to produce the temperature difference required on the evaporation-condenser tubes plus pressure to overcome frictional flow and is discharged through the passage 21 into the lower portion of the chamber 9. The vapor in chamber 9, being under slightly higher pressure, and between one to ten degrees higher in temperature than the vapor in chamber 11, condenses within the tubes 23 as discrete droplets whence it falls onto sloping bottom 49 and is caught by the catch basin 59. It is then passed through the heat exchanger 37 where most of its heat is extracted and it is discharged at 63 as pure cool water. Operation is essentially the same in FIGURE 4.

The number of tubes 23, i.e., the number of series passes, is at least three and preferably a much greater number is used, e.g., from 20 to 100.

The pressure differential between chambers 9 and 11 is on the order of from 5 to 25 cm. Hg and the temperature differential is on the order of 1 to 10° F. The heater 35 is necessary only to make up heat losses in the system.

The plastic film is very thin in order to have good heat transfer characteristics and preferably is from 0.0002 to 0.005 inch in thickness. Of course, films of this thickness lack the mechanical strength either to maintain their shape when the unit is shut down, or to resist bursting during operation due to the pressure differential. However, the presence of the screen member serves both of these purposes as well as inducing turbulent flow of the distilland. The plastic film material must be one which is not wet by water in order to promote drop-wise condensation and it must be one which is inert toward hot brine.

Suitable plastics include hydrocarbon polymers, halohydrocarbon polymers and cyanohydrocarbon polymers and copolymers of any of these such as polythene, polypropylene, polybutene, polystyrene, polybutadiene, polyisoprene and other rubbers, Teflon, polyacrylonitrile and the like. Of these plastics the hydrocarbon plastics are preferred because of their superior long term stability in the presence of water. The polymers after forming into film may be increased in hot strength by chemical vulcanization, by irradiation or by drawing.

Figure 5:
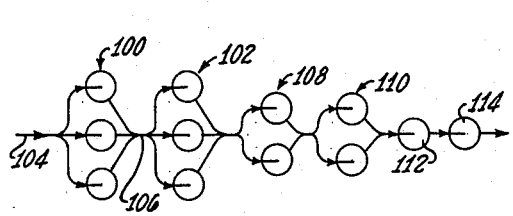
FIGURE 5 is a schematic plan view of the series-parallel feed method which may be employed.

In many instances a series-parallel arrangement may be advantageous since the amount of brine decreases from one stage to the next. Thus, three tubes might be fed in parallel for the first few stages, two tubes in parallel for the next few stages and the remaining stages comprising single tubes fed in series. Thus FIGURE 5 is a schematic plan view of a still employing 11 tubes. The first two banks 100 and 102 comprise three tubes each. Each of the tubes in the first bank 100 is fed in parallel by line 104 from the brine source, while the liquid which does not evaporate runs down the tubes and is collected in line 106 and fed to each of the tubes in tank 102 in parallel. The banks 108 and 110 are similarly fed in series-parallel while the last tubes 112 and 114 are fed in series. This, of course, is merely for illustration purposes and various series-parallel combinations can be used.

I claim:
1. A water still comprising:
 (a) a housing;
 (b) a thin, resinous plastic, water-impermeable film serving as a heat transfer surface dividing said housing into first and second chambers which are respectively a high pressure chamber and a low pressure chamber, said plastic film being of a material not wetted by water and inert to water;
 (c) a perforated screen covering said plastic film on the low pressure side thereof and in intimate contact therewith;
 (d) means for spreading water on the side of said thin plastic heat transfer surface in communication with the low pressure chamber for evaporation of water therefrom;
 (e) means for heating the said water before said water is spread on said plastic heat transfer surface, means for transferring said heated water to said spreading means;
 (f) means for effecting a pressure differential between either side of said plastic film heat transfer surface whereby a relatively higher pressure is created in the first chamber and a relatively lower pressure is created in the second chamber, one side of said last mentioned means being in open communication with the lower pressure chamber and the other side of said means being in open communication with the said higher pressure chamber; and
 (g) said plastic film being of such thickness that it lacks the mechanical strength to support itself during normal operation of the still and said screen serving to strengthen the film and hold it in shape.

2. A water still comprising:
 (a) a housing;
 (b) a tube of a thin, resinous plastic, water-impermeable material serving as a heat transfer surface dividing said housing into first and second chambers which are respectively a high pressure chamber and a low pressure chamber, said plastic tube being of a material not wetted by water and inert to water;
 (c) a perforated screen covering said plastic tube on the low pressure side thereof and in intimate contact therewith;
 (d) means for spreading water on the side of said plastic tube which is in communication with the low pressure chamber for evaporation of water therefrom;
 (e) means for heating the said water before said water is spread on said plastic tube, means for transferring said heated water to said spreading means;

(f) means for effecting a pressure differential between either side of said plastic tube whereby a relatively higher pressure is created in the second chamber, one side of said last mentioned means being in open communication with the lower pressure chamber and the other side of said means being in open communication with said higher pressure chamber; and (g) said plastic tube being of such thickness that it lacks the mechanical strength to support itself during normal operation of the still and said screen serving to strengthen the tube and hold it in shape.

3. The structure of claim 1 wherein the plastic is a member selected from the group consisting of hydrocarbon, halohydrocarbon and cyanohydrocarbon polymers and copolymers.

4. The structure of claim 1 wherein the plastic is a hydrocarbon polymer.

5. The structure of claim 1 wherein said plastic film has a thickness of from 0.005 to 0.0002 inch.

6. The structure of claim 1 wherein the heat transfer member is a tube comprising a thin plastic film with a screen member on the outside thereof.

7. The structure of claim 1 wherein the heat transfer member is a tube comprising a thin plastic film with a screen member on the inside thereof.

References Cited in the file of this patent

UNITED STATES PATENTS

| | | |
|---|---|---|
| 751,058 | Cracknell | Feb. 2, 1904 |
| 896,460 | Prache et al. | Aug. 18, 1908 |
| 1,143,074 | Sanborn | June 15, 1915 |
| 2,363,692 | Reed | Nov. 28, 1944 |
| 2,433,546 | Cornelius | Dec. 30, 1947 |
| 2,530,376 | Castle et al. | Nov. 21, 1950 |
| 2,753,435 | Jepson | July 3, 1956 |
| 2,818,236 | Blaskowski | Dec. 31, 1957 |
| 2,867,425 | Teller | Jan. 6, 1959 |
| 2,899,366 | Hickman | Aug. 11, 1959 |
| 2,923,640 | Buckingham | Feb. 2, 1960 |

FOREIGN PATENTS

| | | |
|---|---|---|
| 205,057 | Australia | Mar. 31, 1955 |